US012524336B2

(12) United States Patent
Hu et al.

(10) Patent No.: US 12,524,336 B2
(45) Date of Patent: Jan. 13, 2026

(54) MANAGEMENT OF ERASABLE UNITS OF MEMORY BLOCKS IN SOLID STATE DRIVES

(71) Applicant: SK Hynix NAND Product Solutions Corp., Rancho Cordova, CA (US)

(72) Inventors: Chaohong Hu, San Jose, CA (US); Ning Wu, Folsom, CA (US); Cory Lappi, Rochester, MN (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 117 days.

(21) Appl. No.: 18/375,356

(22) Filed: Sep. 29, 2023

(65) Prior Publication Data
US 2025/0110866 A1 Apr. 3, 2025

(51) Int. Cl.
G06F 12/02 (2006.01)
(52) U.S. Cl.
CPC ................ *G06F 12/0246* (2013.01)
(58) Field of Classification Search
CPC .................................................. G06F 12/0246
See application file for complete search history.

(56) References Cited

U.S. PATENT DOCUMENTS

| 2002/0041517 | A1* | 4/2002 | Kim | G06F 12/0246 |
| | | | | 365/185.11 |
| 2002/0097594 | A1* | 7/2002 | Bruce | G11C 16/10 |
| | | | | 711/E12.04 |
| 2008/0177933 | A1* | 7/2008 | Nobunaga | G11C 29/76 |
| | | | | 711/E12.078 |
| 2008/0201392 | A1* | 8/2008 | Nakajima | G06F 12/0246 |
| 2011/0161560 | A1* | 6/2011 | Hutchison | G06F 12/0246 |
| | | | | 711/202 |
| 2011/0167204 | A1 | 7/2011 | Estakhri et al. | |
| 2011/0283050 | A1* | 11/2011 | Pasquale | G06F 12/0246 |
| | | | | 711/E12.001 |

(Continued)

FOREIGN PATENT DOCUMENTS

JP 2012159993 A 8/2012
KR 100644602 B1 11/2006

OTHER PUBLICATIONS

SK Hynix NAND Product Solutions Corp. (dba Solidigm), PCT/US2024/048605, International Search Report and Written Opinion, Jan. 3, 2025, 10 pgs.

*Primary Examiner* — Eric T Loonan
(74) *Attorney, Agent, or Firm* — Morgan, Lewis & Bockius LLP

(57) ABSTRACT

This invention is directed to managing data storage in a memory system. The memory system receives a host request for an erase operation on a first erasable unit of a first memory block. In response to the host request, the memory system identifies an unused erasable unit of a second memory block in the memory system, remaps the first erasable unit of the first memory block to the unused erasable unit of the second memory block, and applies the erase operation on the unused erasable unit of the second memory block in place of the first erasable unit of the first memory block. In some embodiments, at a time of receiving the host request, the memory system further includes a space reserve of over-provisioning, and the second memory block is different from the space reserve. In some embodiments, the second memory block is moved offline to join the space reserve.

20 Claims, 12 Drawing Sheets

(56) References Cited

U.S. PATENT DOCUMENTS

| | | |
|---|---|---|
| 2012/0198186 A1 | 8/2012 | Koshiyama et al. |
| 2014/0310447 A1 | 10/2014 | Chang et al. |
| 2017/0242722 A1* | 8/2017 | Qiu ........................ G06F 3/0655 |
| 2018/0365142 A1* | 12/2018 | Sandberg ................ G11C 29/00 |
| 2020/0218649 A1* | 7/2020 | Dinges ................ G06F 12/0897 |
| 2021/0026547 A1* | 1/2021 | Peh ........................ G06F 3/0604 |
| 2021/0132803 A1 | 5/2021 | Hong |
| 2021/0191850 A1* | 6/2021 | Subbarao ................ G06F 3/064 |

\* cited by examiner

MANAGEMENT OF ERASABLE UNITS OF MEMORY BLOCKS IN SOLID STATE DRIVES

TECHNICAL FIELD

This application relates generally to memory management including, but not limited to, methods, systems, and non-transitory computer-readable media for managing data storage in a memory system (e.g., solid-state drive).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). Over-provisioning is applied to provide additional capacity to erase data from an SSD without interrupting system performance. A sufficiently large over-provisioning space needs to be reserved to guarantee that a host of the SSD can open sufficient blocks for the worst case customer workloads. As a block size of a NAND-based SSD is reduced, program/erase (P/E) operations are required to be implemented successively on corresponding blocks in a superblock. Many blocks are open during normal operation, and adjacent blocks within the same superblock cannot be reclaimed. It would be beneficial to manage data storage operations in memory blocks of a memory system to enhance overall performance of an SSD.

SUMMARY

Various embodiments of this application are directed to methods, systems, devices, and non-transitory computer-readable media for managing data storage operations in erasable units of memory blocks of a memory system to enhance overall performance of an SSD (e.g., by reducing a size of an over-provisioning space and/or implementing concurrent P/E operations and reclaim operations on adjacent erasable units of memory blocks). Minimal initial over-provisioning is implemented to create a space reserve that facilitates consistent operation of the SSD. Additional over-provisioning space is reserved only if needed during subsequent operation of the SSD. In an example, the difference between a normal and worst-case over-provisioning space budget required can reach 3%, and based on the host workloads a worst-case might never occur. In some embodiments of this application, data storage in erasable units of memory blocks is dynamically managed via a request for pulling the erasable units of memory blocks offline and adding the erasable units to over-provisioned space on demand. The erasable units of the memory blocks form one or more of: zones, a zone group, or a plurality of zone groups. For example, the host device pulls a requested number of empty zones or zones filled with non-valid host data. These zones are used to facilitate management of data storage, thereby avoiding the additional over-provisioning space to be reserved in advance, while P/E operations and reclaim operations can still be implemented concurrently using adjacent erasable units of memory blocks that are moved offline dynamically and on demand.

In one aspect, a method is implemented to manage data storage in a memory system (e.g., including one or more SSDs). The method includes receiving a host request for an erase operation on a first erasable unit of a first memory block. The method further includes in response to the host request, identifying an unused erasable unit of a second memory block in the memory system, remapping the first erasable unit of the first memory block to the unused erasable unit of the second memory block, and applying the erase operation on the unused erasable unit of the second memory block in place of the first erasable unit of the first memory block.

In some embodiments, the memory system further includes a space reserve of over-provisioning, and at a time of receiving the host request, the second memory block is different from (i.e., not included in) the space reserve of over-provisioning. In some embodiments, the method further includes after identifying unused erasable unit, moving the unused erasable unit of the second memory block to an offline state and sending a message to a host device indicating that the unused erasable unit of the second memory block is moved offline, e.g., to join the space reserve of over-provisioning. Further, in some embodiments, the second memory block includes one or more remaining erasable units distinct from the unused erasable unit. The method further includes moving the one or more remaining erasable units of the second memory block to the offline state jointly with the unused erasable unit.

In some embodiments, the method further includes determining that a second erasable unit of the first memory block is already open for a first write operation, wherein the second erasable unit is distinct from the first erasable unit. Identifying, mapping, and applying operations are implemented in accordance with a determination that the second erasable unit is already open for the first write operation. Further, in some embodiments, the erase operation is implemented concurrently with the first write operation.

Some implementations of this application include an electronic device that includes one or more processors and memory having instructions stored thereon, which when executed by the one or more processors cause the processors to perform any of the above methods on a memory system (e.g., SSDs).

Some implementations include a non-transitory computer readable storage medium storing one or more programs. The one or more programs include instructions, which when executed by one or more processors cause the processors to implement any of the above methods on a memory system (e.g., SSDs).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

This application is directed to managing data storage of erasable units of memory blocks in a memory system to enhance overall performance of an SSD (e.g., by reducing a size of an over-provisioning space and/or implementing P/E operations and reclaim operations concurrently on adjacent erasable units of memory blocks). Minimal initial over-provisioning is implemented to create a space reserve that facilitates consistent operation of the SSD. Additional over-provisioning space is reserved only if needed during subsequent operation of the SSD. In an example, the difference between a normal and worst-case over-provisioning space budget required can reach 3%, and based on the host workloads a worst-case might never occur. In some embodiments of this application, data storage in erasable units of memory blocks is dynamically managed via a request for pulling the erasable units of memory blocks offline and adding the erasable units to over-provisioned space on demand. The erasable units of the memory blocks form one or more of: zones, a zone group, or a plurality of zone groups. The host capacity is monotonously decreased, and host offline zones would not be reversed back. The recovered physical erasable block (e.g., due to a lockout clean-up) would go back to device managed over-provisioning pool. These empty or invalid zones are used to facilitate management of data storage (e.g., implement P/E operations and reclaim operations concurrently on adjacent erasable units of memory blocks), while avoiding or reducing a demand for the additional over-provisioning space.

Figure 1:
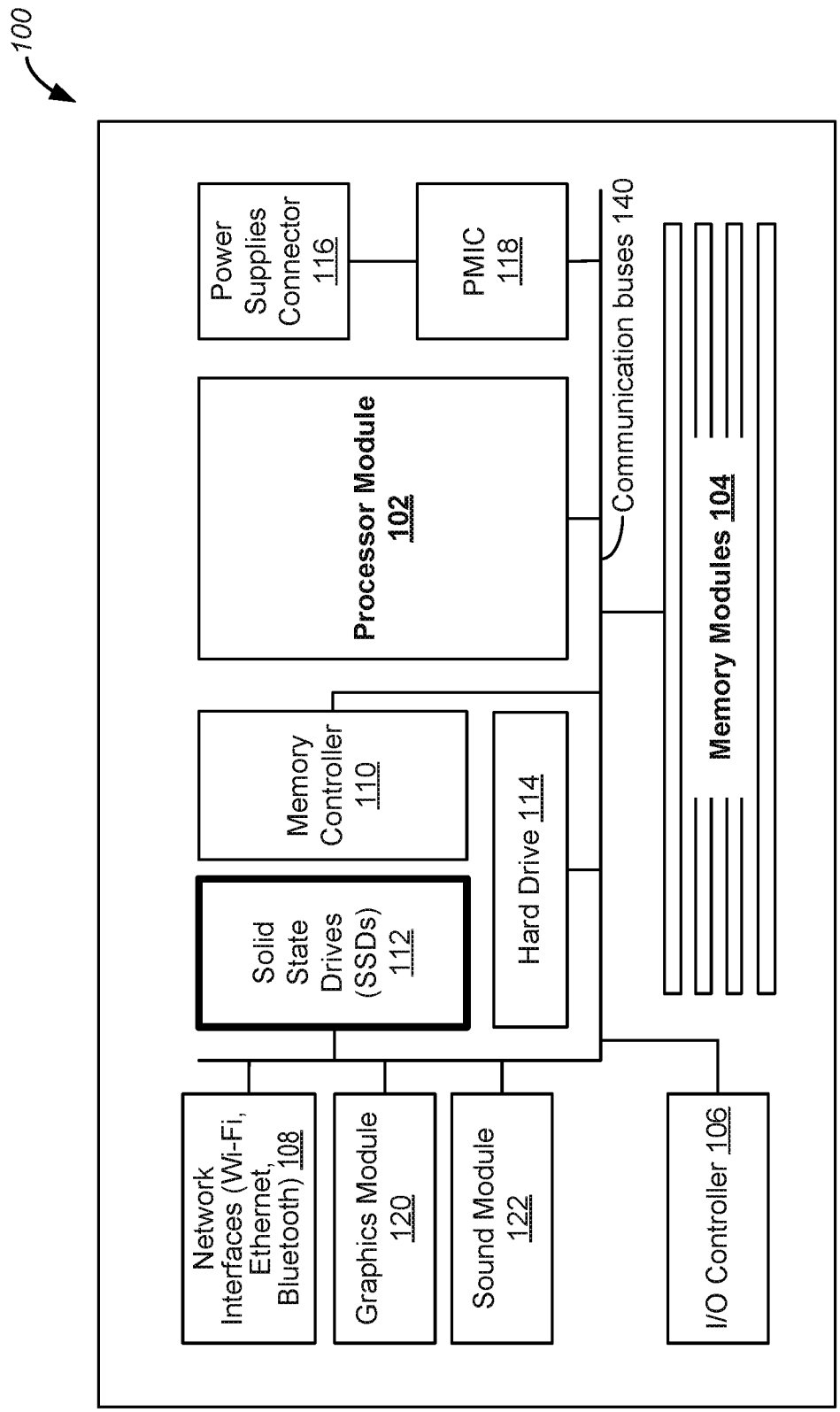
FIG. 1 is a block diagram of an example system module in a typical electronic device in accordance with some embodiments.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 140 include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Figure 2:
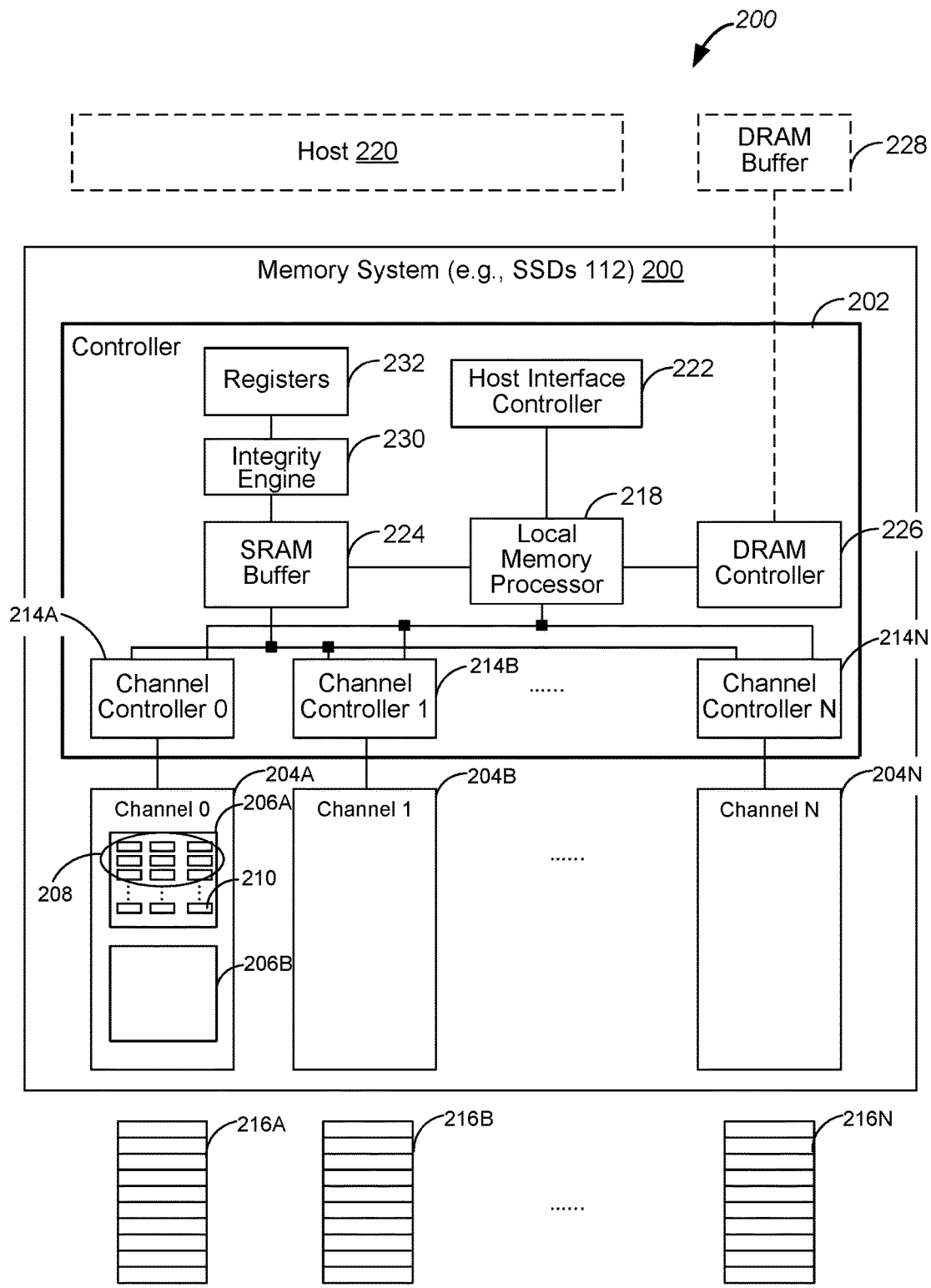
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220.

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory system 200 stores information of an ordered list of superblocks in a cache of the memory system 200. In some embodiments, the cache is managed by a host driver of the host device 220, and called a host managed cache (HMC).

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A. 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228 that is in memory system 200. Alternatively, in some embodiments, the local memory processor 218 stores data to be written into, or read from, each memory block in the plurality of memory channels 204 in a DRAM buffer 228 that is main memory used by the processor module 102 (FIG. 1). The local memory processor 218 of the controller 202 accesses the DRAM buffer 228 via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory system 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204.

Figure 3:
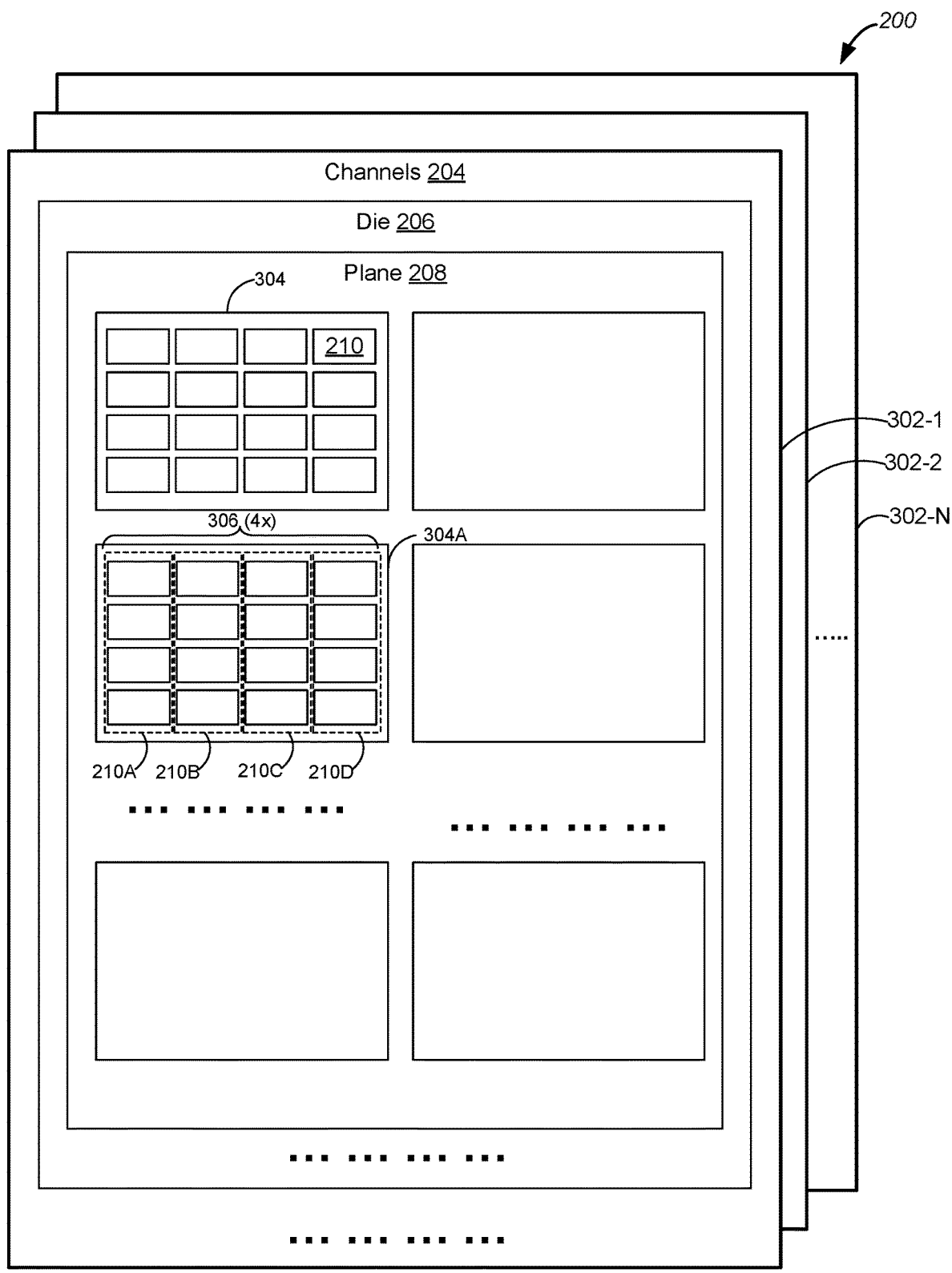
FIG. 3 is a block diagram of a memory system of an example electronic device, in accordance with some embodiments.

FIG. 3 is a block diagram of a memory system 200 of an example electronic device, in accordance with some embodiments. In some embodiments, the memory system 200 has a single SSD 302-1. Alternatively, in some embodiments, the memory system 200 has a plurality of SSDs 302-1, 302-2, . . . , and 302-N. Each SSD 302 includes a controller 202 and a plurality of memory channels 204 that are mounted on a single substrate (e.g., a printed circuit board (PCB)) jointly with the controller 202. Each memory channel 204 includes one or more memory dies 206. Each memory die 206 includes a plurality of memory planes 208, and each memory plane 208 further includes a plurality of memory pages 210. Each memory page 210 includes an ordered set of memory cells.

In some embodiments, the plurality of memory pages 210 of each memory plane 208 is organized to a plurality of memory blocks 304. Each memory block 304 includes a set of memory pages 210 included in a respective memory plane 208 of a memory die 206 in a respective memory channel 204 of a respective SSD 302. In some embodiments, the set of memory pages 210 on each memory block 304 is erased jointly, and any subset of each memory block 304 that is less than the entire memory block 304 (e.g., a single page 210) cannot be erased separately. Alternatively, in some embodiments, each memory block 304 corresponds to a plurality of erasable units 306, and each erasable unit 306 includes a subset (e.g., less than all) of the memory pages 210 of the respective memory block 304. For example, a first memory block 304A corresponds to four erasable units 306, and the four erasable units 306 further include a first subset of memory pages 210A, a second subset of memory pages 210B, a third subset of memory pages 210C, and a fourth subset of memory pages 210D. In some embodiments, "erasable unit" is also called "zone" and associated with one or more decks. For each erasable unit 306, the corresponding subset of memory pages (e.g., 210A) is erased jointly, independently of any other subset of memory pages (e.g., 210B. 210C, and 210D) associated with any other erasable unit 306 in the same memory block 304A or other memory blocks 304. For example, the first subset of memory pages 210A is erased, while the subsets of memory pages 210B-210D are not erased. Stated another way, in some embodiments, each erasable unit 306 is the smallest memory unit that is managed jointly for erase operations.

In some embodiments, an erasable unit 306 includes only a plurality of memory pages 210, and all of the plurality of memory pages 210 belong to the same memory block 304 that is located on a corresponding memory plane 208 of a memory die 206 in the SSD 302. Alternatively, in some embodiments, an erasable unit 306 includes only a plurality of memory pages 210, and corresponds to a plurality of memory blocks 304 located on a corresponding memory plane 208 of a memory die 206 in the SSD 302. The erasable unit 306 includes a plurality of decks distributed on the plurality of memory blocks 304. For example, a first deck of the erasable unit 306 is included in a first memory block 304A, and a second deck of the erasable unit 306 is included in a second memory block.

Figure 4A:
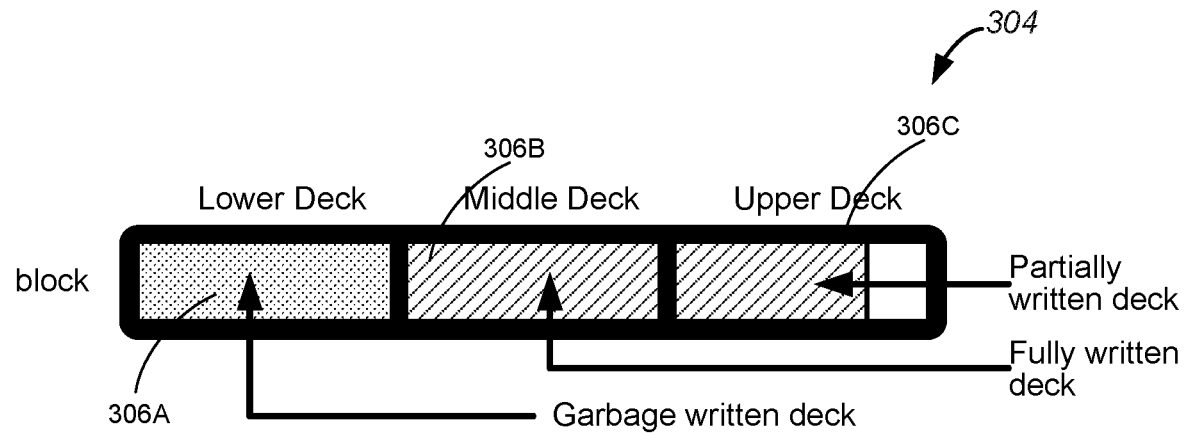
FIG. 4A is a structural diagram of an example memory block having a plurality of erasable units, in accordance with some embodiments.
Figure 4B:
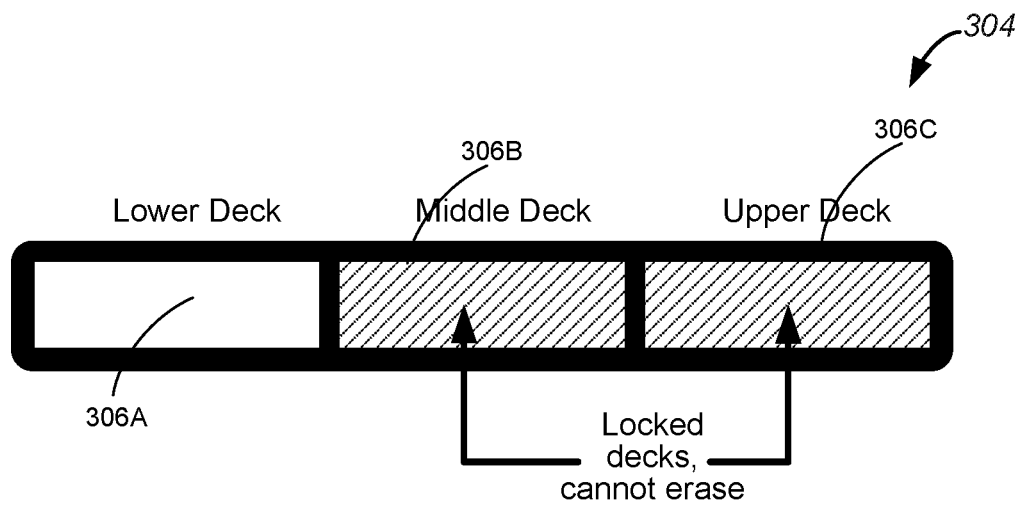
FIG. 4B is a diagram showing an example operation on a plurality of erasable units of a memory block shown in FIG. 4A, in accordance with some embodiments.

FIG. 4A is a structural diagram of an example memory block 304 having a plurality of erasable units 306, in accordance with some embodiments, and FIG. 4B is a diagram showing an example operation on a plurality of erasable units 306 of a memory block 304 shown in FIG. 4A, in accordance with some embodiments. As explained above, a plurality of memory pages 210 located on a memory page 208 of a memory die 206 is grouped to a memory block 304. In some embodiments, all memory cells of the memory block 304 are erased jointly. Alternatively, in some embodiments, the plurality of memory pages 210 of the memory block 304 are regrouped to the plurality of erasable units 306 (e.g., three erasable units 306A, 306B, and 306C). Each erasable unit 306 includes a respective subset of the plurality of memory pages 210 of the memory block 304, and is the smallest memory unit in which memory cells are erased jointly. "Erasable unit" is also called "zone" or "deck." Referring to FIG. 4A, in some embodiments, a first erasable unit 306A (also called lower deck) is written with invalid garbage data, which is marked "stale". A second erasable unit 306B (also called middle deck) includes a fully written deck of valid data, and a third erasable unit 306C (also called upper deck) includes a partially written deck. The memory block 304 is controlled using a block-by-deck (BBD) scheme in which each of the plurality of erasable units 306 is accessed independently. Given that each erasable unit 306 is in size smaller than a memory block 304, this BBD scheme allows the memory system 200 to be controlled (e.g., for erases) with a smaller memory unit size.

In some embodiments, the plurality of erasable units 306 of the memory block 304 is configured to comply with a memory policy. In accordance with the policy, at most only one erasable unit 306 of each memory block 304 is erased or partially programmed at a time, and remaining erasable unit(s) 306 must be fully programmed. Each of the plurality of erasable units 306 is independently erased. For example, referring to FIG. 4A, the third erasable unit 306C is currently open for writing or programming, and the remaining erasable units 306A and 306B of the memory block 304 are closed. While the third erasable unit 306C is currently open, no erase or writing operation can be implemented on any of the remaining erasable units 306A and 306B. Referring to FIG. 4B, in some embodiments, the memory block 304 includes three erasable units 306A, 306B, and 306C, and is accessed in accordance with the memory policy. A second erasable unit 306B and a third erasable unit 306C are locked and cannot be erased, while a first erasable unit 306A is open to be written or erased.

Figure 4C:
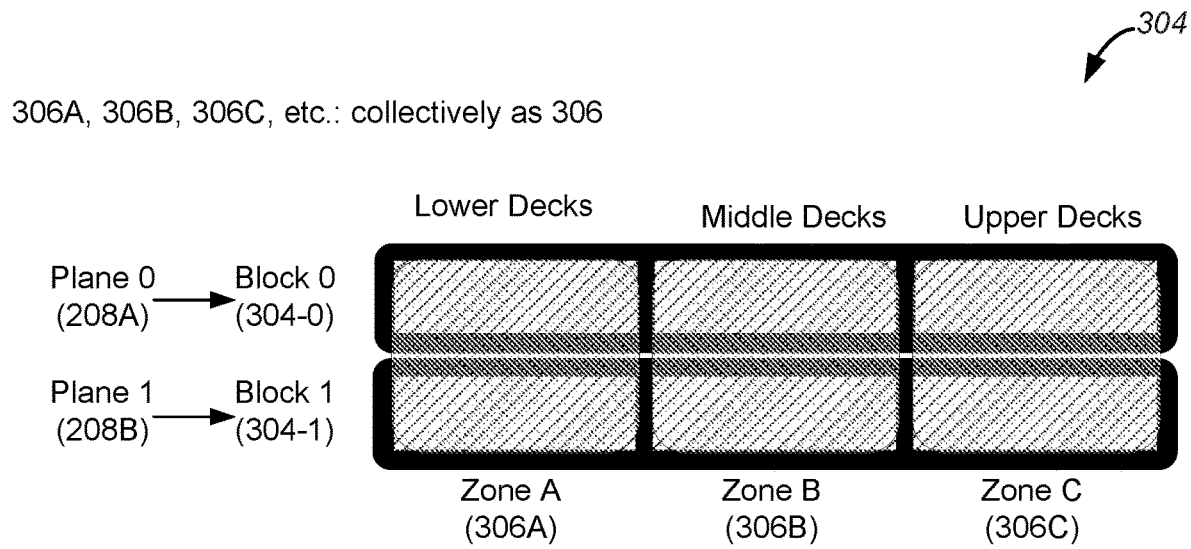
FIG. 4C is a structural diagram of an example set of two memory blocks having a plurality of erasable units.
Figure 4D:
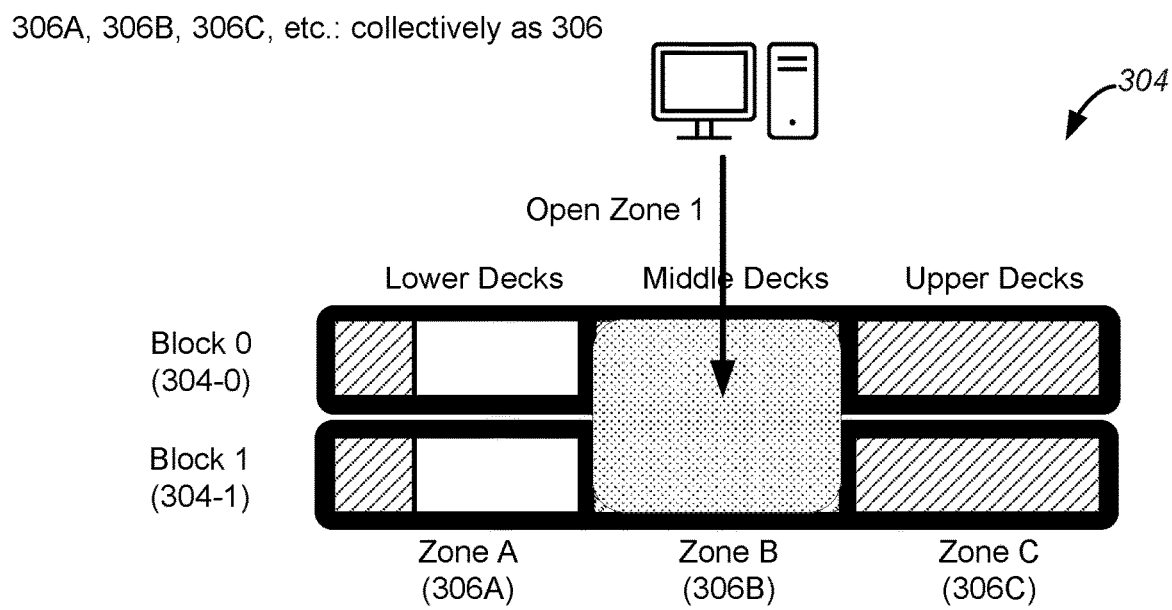
FIG. 4D is a diagram showing an example operation on a plurality of erasable units of a set of two memory blocks shown in FIG. 4C, in accordance with some embodiments.

FIG. 4C is a structural diagram of an example set of two memory blocks 304 having a plurality of erasable units 306, and FIG. 4D is a diagram showing an example operation on a plurality of erasable units 306 of a set of two memory blocks 304 shown in FIG. 4C, in accordance with some embodiments. Each memory block 304 includes a plurality of memory pages 210 (FIG. 2). Memory pages 210 of two memory blocks 304-0) (Block 0) and 304-1 (Block1) are regrouped jointly to a plurality of erasable units 306 (e.g., three erasable units 306A, 306B, and 306C). Each erasable unit 306 includes a first subset of the plurality of memory pages 210 of the memory block 304-0 and a second subset of the plurality of memory pages 210 of the memory block 304-1. In some embodiments, the memory block 304-0) is included in a first memory plane 208A (plane 0) of a memory die 206 (FIG. 2), and the memory block 304-1 is included in a second memory plane 208B (plane 1) of the memory die 206. The second memory plane 208B is distinct from the first memory plane 208A. Each erasable unit 306 is the smallest memory unit in which memory cells are erased jointly. In this example, "erasable unit" is also called "zone" and associated with two decks. In some embodiments not shown, each erasable unit includes one, three, four, or another integer number of decks.

Referring to FIG. 4C, in some embodiments, each of three erasable units 306A, 306B, and 306C is fully written. The memory blocks 304-0) and 304-1 are controlled jointly using a block-by-deck (BBD) scheme in which each of the plurality of erasable units 306 is accessed independently. Given that each erasable unit 306 is smaller than a memory block 304 in size, this BBD scheme allows a memory system 200 to be controlled (e.g., for erases) with a smaller memory unit size. In an example, an SSD includes a NAND-based flash memory chip. Each erasable unit 306A, 306B, or 306C is also called a zone having two sister decks that are provided by two adjacent memory blocks 304A and 304B. Each deck has a size of 64 megabytes (MB), and each erasable unit 306A, 306B, or 306C has a size of 128 MB.

In some embodiments, the plurality of erasable units 306 of the memory blocks 304-0) and 304-1 is configured to comply with a memory policy. In accordance with the memory policy, at most only one erasable unit 306 of the memory blocks 304-0 and 304-1 is erased or partially programmed at a time, and remaining erasable unit(s) 306 must be fully programmed and closed. For example, referring to 4D, the memory blocks 304-0) and 304-1 include three erasable units 306A, 306B, and 306C (zones A, B, and C), and is accessed in accordance with the memory policy. A second erasable unit 306B (e.g., zone B including two middle decks) is written with invalid garbage data, which is marked "stale," and a third erasable unit 306C (e.g., zone C including two upper decks) is fully written. The erasable units 306B and 306C are locked and cannot be erased, while a first erasable unit 306A (e.g., zone A including lower decks) is open to be written with data by a host device 220) (FIG. 2) coupled to the memory system 200.

The memory policy leverages the BBD scheme to ensure that at most only one erasable unit 306 is ever not in the fully written state. That said, even an "empty" erasable unit 306 (e.g., the erasable unit 306A in FIG. 4A) might likely be fully written with invalidated garbage data just to avoid locking decks. In some embodiments, garbage data includes data stored in memory cells that are not mapped for host reads. In some embodiments, garbage data includes data that was originated by a controller 202 (FIG. 2) for deck padding purposes. In some embodiments, garbage data includes host data that is invalidated.

Referring to FIG. 4D, in some embodiments, the first erasable unit 306A is partially written, and the host device 220 attempts to erase and start writing to the erasable unit 306B or 306C via a zone open operation. The memory policy requires that the erasable unit 306B and 306C to be closed or locked out when the first erasable unit 306A is open for writing. In some embodiments, a space reserve (e.g., 510 in FIG. 5) is applied to control two or more of the plurality of erasable units 306 of the same memory block(s) 304 for erasing or programming concurrently, while complying with the memory policy. Specifically, in some embodiments, a memory system 200 receives a host request for an erase operation on a first erasable unit of a first memory block that optionally has another erasable unit open. In response to the host request, the memory system 200 identifies an unused erasable unit of a second memory block in the memory system 200, and moves the unused erasable unit offline dynamically to join the space reserve. The memory system 200 then remaps the first erasable unit of the first memory block to the unused erasable unit of the second memory block, and applies the erase operation on the unused erasable unit of the second memory block in place of the first erasable unit of the first memory block. By these means, the first erasable unit of the first memory block may be closed, while the erase operation is implemented by way of the unused erasable unit of the second memory block without violating the memory policy.

Figure 5A:
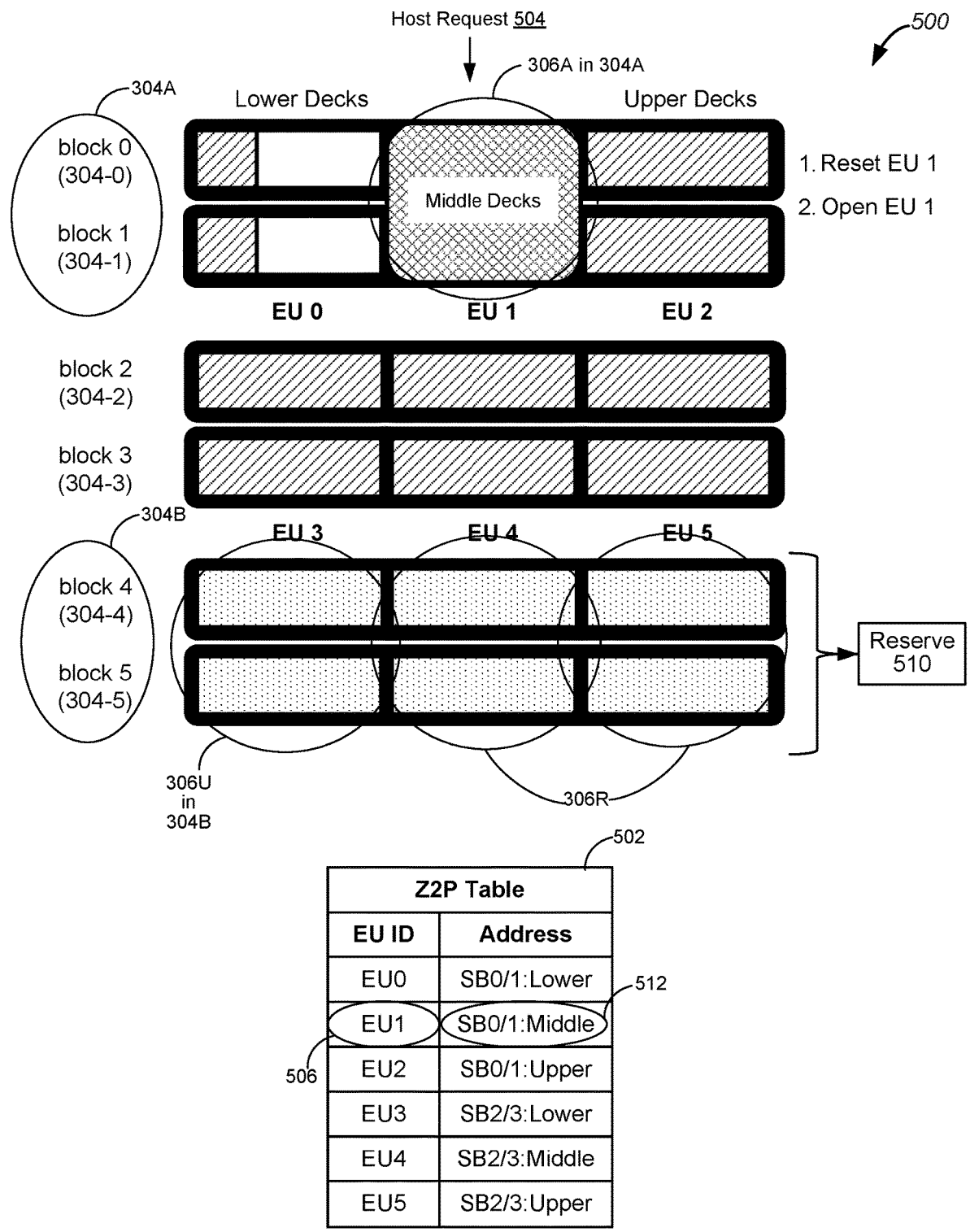
FIGS. 5A-5C are structural diagrams of an example memory system including six memory blocks and a zone map table and illustrate an example process of managing data storage in the memory system, in accordance with some embodiments.
Figure 5B:
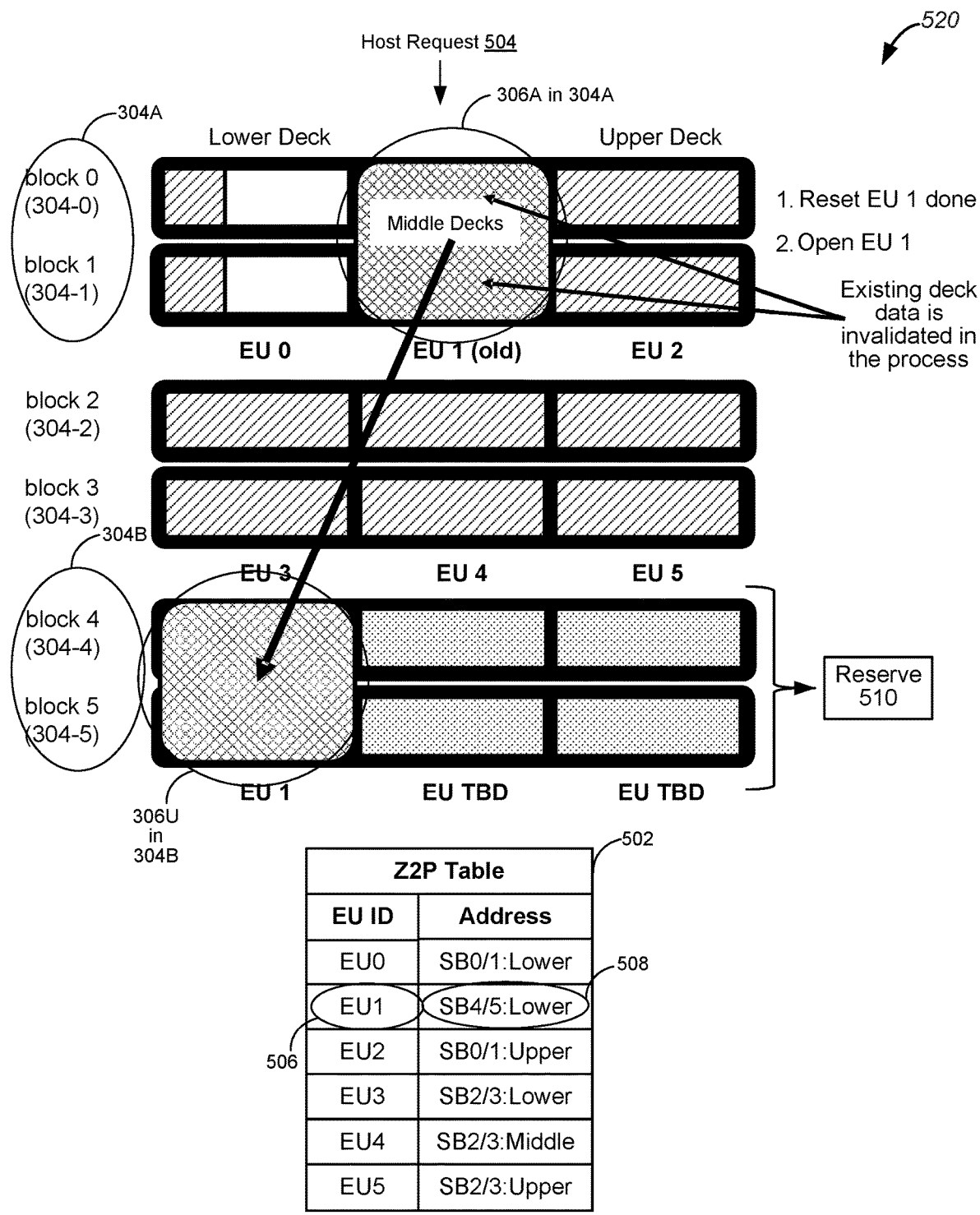
Figure 5C:
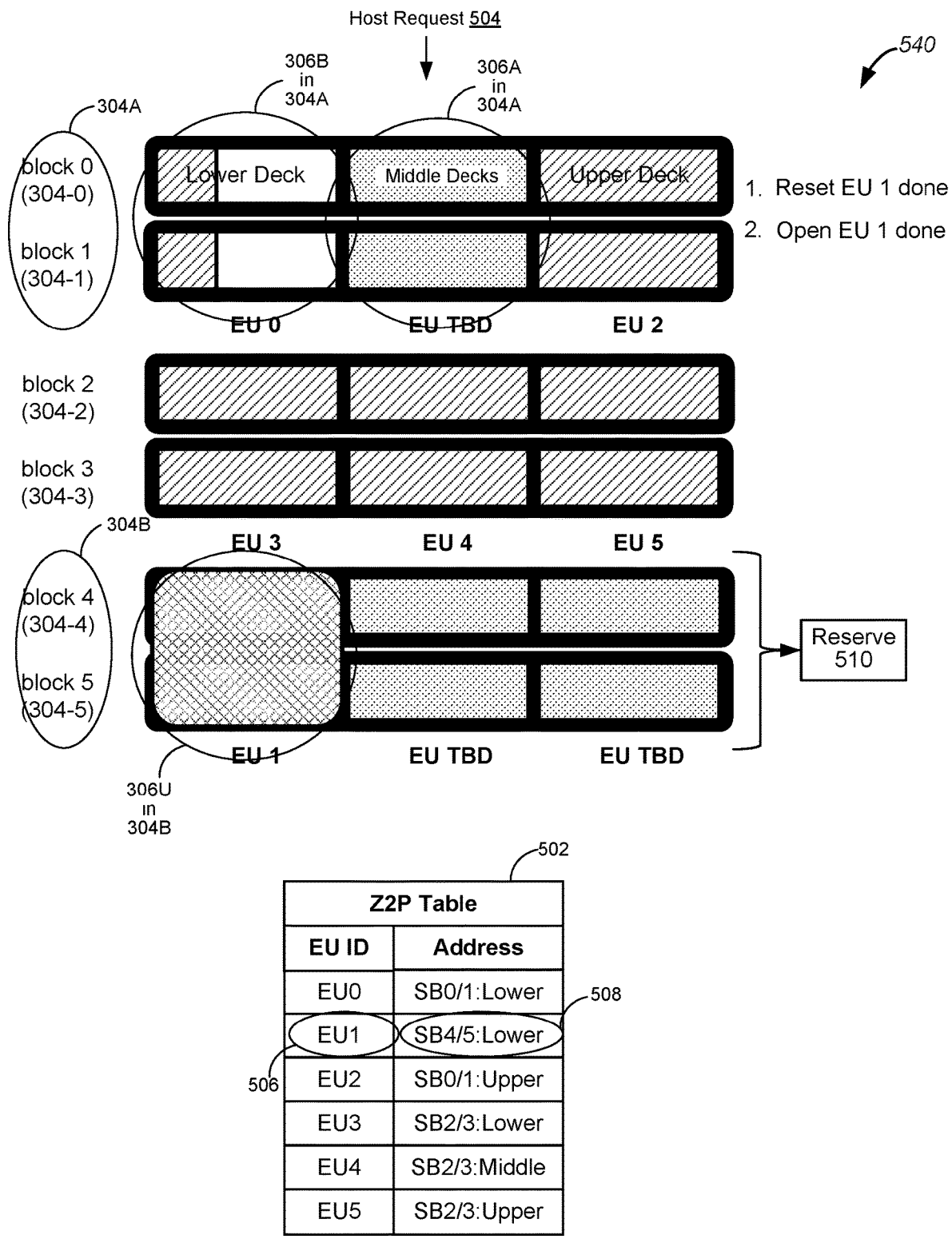

FIGS. 5A-5C are structural diagrams 500, 520, and 540 of an example memory system 200 including six memory blocks 304 and an example zone map table 502, in accordance with some embodiments. FIGS. 5A, 5B, and 5C illustrate a process of managing data storage in the memory system 200 in response to a host request for an erase operation on a first erasable unit 306A associated with a first memory block 304A. The six memory blocks 304 include memory block 304-1 (block 0), memory block 304-2 (block 1), memory block 304-2 (block 2), memory block 304-3 (block 3), memory block 304-4 (block 4), and memory block 304-5 (block 5). In some embodiments, every two of the memory blocks 304-0) to 304-5 are grouped to a memory block set, and divided jointly to provide a plurality of erasable units (e.g., 2, 3, 4 or more erasable units). For example, the memory blocks 304-0) and 304-1 are divided jointly to erasable units EU0, EU1, EU2. The memory blocks 304-2 and 304-3 are divided jointly to erasable units EU3, EU4, EU5. Each of the erasable units EU0-EU5 includes two decks included in two distinct memory blocks 304, respectively. Each of the erasable units EU0-EU5 is the smallest memory unit in which memory cells are erased jointly. "Erasable unit" is also called "zone."

It is noted that in some embodiments, each memory block set includes a single memory block 304, and each erasable unit 306 includes only a subset of memory cells of the single memory block 304. In some situations, a memory block set is also called as a memory block having a larger size. In some embodiments, each memory block set includes three or more memory blocks 304, and each erasable unit 306 includes a subset of memory cells of each of the three or more memory blocks 304. In some embodiments, each memory block set includes two erasable units 306. In some embodiments, each memory block set includes four or more erasable units 306.

Each erasable unit 306 of the memory blocks 304-0 to 304-3 is identified by an erasable unit identification (e.g., EU0, EU1, . . . , EU5). The zone map table 502 is configured to map each erasable unit identification to a physical address in the memory system 200. In accordance with the zone table 502. For example, the erasable units EU0, EU1, EU2, EU3, EU4, and EU5 are mapped to physical addresses including "SB0/1: lower," "SB0/1: middle," "SB0/1: upper," "SB2/3: lower," "SB2/3: middle," and "SB2/3: upper," respectively.

Referring to FIG. 5A, in some embodiments, the erasable unit EU0 includes two partially written decks. The erasable unit EU1 is written with invalid garbage data, which is marked "stale". The erasable unit EU2 includes a fully written deck of valid data. The memory blocks 304-0) and 304-1 are controlled using a BBD scheme in which each of the erasable units EU0, EU1, and EU2 is accessed independently. In some embodiments, the erasable units EU0, EU1, and EU2 of the memory blocks 304-0) and 304-1 are configured to comply with a memory policy requiring that at most only one erasable unit 306 of the memory blocks 304-0) and 304-1 is erased or partially programmed at a time and that remaining erasable unit(s) 306 must be fully programmed and closed. The erasable units EU1 and EU2 are locked and cannot be erased, while the erasable unit EU0 (e.g., including lower decks of the memory blocks 304-0) and 304-1) is open to be written with data by a host device 220 (FIG. 2) coupled to the memory system 200.

In some embodiments, a memory system 200 receives the host request 504 for an erase operation on a first erasable unit 306A (e.g., EU1) associated with a first memory block 304A (e.g., 304-0) and 304-1) that optionally has another erasable unit (e.g., EU0) open. The host request 504 includes a zone identifier 506 identifying the first erasable unit 306A. In some embodiments, the memory policy requires that the host request 504 to be delayed, until the other open erasable unit (e.g., EU0) to be completed written and closed. Alternatively, in some embodiments, in response to the host request 504, the memory system 200 identifies an unused erasable unit 306U associated with a second memory block 304B (e.g., 304-4 and 304-5) in the memory system 200. The second memory block 304 is not locked out. Stated another way, in some embodiments, the memory system 200 determines that a second erasable unit 306B (e.g., EU0) of the first memory block 304A is already open for a first write operation. The second erasable unit 306B is distinct from the first erasable unit 306A. Identification of the unused erasable unit 306U, mapping to the unused erasable unit 306U, and application of the erase operation are implemented in accordance with a determination that the second erasable unit 306B is already open for the first write operation. By these means, the erase operation and the first write operation are implemented concurrently on erasable units 306 of two distinct memory blocks 304A and 304B, respectively.

In some embodiments, the memory system further includes a space reserve 510 of over-provisioning, and at a time of receiving the host request, the second memory block 304 is different and distinct from (i.e., not included in) the space reserve of over-provisioning. The space reserve 510 (e.g., additional empty or unused memory blocks) is applied to control two or more of the plurality of erasable units 306 of the same memory block(s) 304 for concurrent erasing or programming operations in compliance with the memory policy. Specifically, after being identified in response to the host request 504, the unused erasable unit 306U of the second memory block 304B is moved to an offline state to become part of the space reserve 510. A message is sent to a host device 220 (FIG. 2) indicating that the unused erasable unit 306U of the second memory block 304 is moved offline, e.g., to join the space reserve 510 of over-provisioning. Further, in some embodiments, the second memory block 304B includes one or more remaining erasable units 306R distinct from the unused erasable unit 306U. The one or more remaining erasable units 306R of the second memory block 304B are moved to the offline state jointly with the unused erasable unit 306U. Stated another way, in some embodiments, after the unused erasable unit 306U is identified in response to the host request 504, the space reserve 510 is expanded to include the unused erasable unit 306U of the second memory block 304B, optionally with the one or more remaining erasable units 306R of the second memory block 304B. A portion of the space reserve 510 corresponding to the unused erasable unit 306U of the second memory block 304B does not need to be reserved in advance, and is identified on demand to enable concurrent operations to different erasable units EU0 and EU1 of the same block (e.g., block 304A).

In some embodiments, the second memory block 304B and the first memory block 304A are located on the same memory plane 208 of the memory system 200. In some embodiments, the second memory block 304B and the first memory block 304A are located on two distinct memory plane 208 of the memory system 200. In some embodiments, the second memory block 304B and the first memory block 304A are located on two distinct memory dies 206 of the same memory channel 204 of the memory system 200. In some embodiments, the first memory block 304A is configured to provide the first erasable unit 306A with an alternative memory block 304-0 or 304-1, and the first memory block 304A and the alternative memory block 304-0) or 304-1 are located on two distinct memory planes 208. The first erasable unit 306A includes a first portion (e.g., a middle deck) in the first memory block 304A and a second portion (e.g., a middle deck) of the alternative memory block 304-0) or 304-1. Further, in some embodiments, the second memory block 304B is configured to provide the unused erasable unit 306U with an alternative memory block 304-4 or 304-5, and the second memory block 304B and the alternative memory block 304-4 or 304-5 are located on two distinct memory planes 208. The unused erasable unit 306U includes a first portion (e.g., a lower deck) in the second memory block 304B and a second portion (e.g., a lower deck) of the alternative memory block 304-4 or 304-5.

Referring to FIG. 5B, the memory system 200 remaps the first erasable unit 306A of the first memory block 304A to the unused erasable unit 306U of the second memory block 304B. In some embodiments, the memory system 200 identifies, in the zone map table 502, the zone identifier 506 associated with the first erasable unit 306A of the first memory block 304A, and associates, in the zone map table 502, the zone identifier 506 with an address 508 (FIG. 5B) of the unused erasable unit 306U of the second memory block 304B. Stated another way After remapping, the zone map table 502 does not include an physical address 512 associated with the first erasable unit 306A of the first memory block 304A is replaced with the address 508 of the unused erasable unit 306U of the second memory block 304B. After remapping, the physical address 512 (e.g., "SB0/1: Middle") does not exist in this part of the zone map table 502, and the zone identifier 506 identified by the host request 504 refers to the unused erasable unit 306U of the second memory block 304B. By these means, the host request 504 does not cause concurrent accesses or operations to two erasable units 306 in the same memory block set any more.

Referring to FIG. 5C, the memory system 200 applies the erase operation on the unused erasable unit 306U of the second memory block 304B (which has a zone identifier "EU1") in place of the first erasable unit 306A of the first memory block 304A. In some embodiments, after the erase operation, the unused erasable unit 306U of the second memory block 304B stays open for one or more second write operations. In some situations, prior to receiving the host request 504, the memory device 200 opens the second erasable unit 306B of the plurality of erasable units 306 of the first memory block 304A for a first write operation, in accordance with a determination that one or more remaining erasable units of the first memory block 304A, including the first erasable unit 306A, are filled and closed for any write or erase operation. The second erasable unit 306B of the first memory block 304A is already open for the first write operation when the host request 504 is received. The unused erasable unit 306U of the second memory block 304B is opened concurrently with the second erasable unit 306B of the first memory block 304A. That said, the erasable units EU0 and EU1 of two distinct memory blocks 304A and 304B are opened for different memory operations (e.g., writing or erasing). The first erasable unit 306A of the first memory block 304A remains closed without violating the memory policy. By these means, the first erasable unit 306A of the first memory block 304A may be closed, while the erase operation is implemented by way of the unused erasable unit 306U of the second memory block 304B without violating the memory policy.

During this process, the first erasable unit 306A of the first memory block 304A is reset, and the unused erasable unit 306U of the second memory block 304B is opened and associated to the zone identifier 506 of the host request 504. In some embodiments, reset zones (e.g., the first erasable unit 306A in FIG. 5C) are not included in a managed resource pool, and open zones (e.g., the unused erasable unit 306U in FIG. 5C) are included the managed resource pool. The managed resource pool has a predefined size limit. Thus, a total size of erasable units that are be remapped to avoid the memory policy is limited by the predefined size limit of the managed resource pool, so is a size of the unused erasable units, which can be moved to the space reserve 510, limited and controlled. Additionally, the memory system 200 further includes the space reserve of over-provisioning. The second memory block 304B is different from (i.e., not included in) the space reserve 510 of over-provisioning at a time of receiving the host request 504, and subsequently moved to the space reserve 510. By these means, over-provisioning space does not need to be reserved in advance and can be created on demand to enable concurrent memory operations in compliance with the memory policy, thereby reducing a size of the space reserve 510 of over-provisioning pre-defined and waiting in the memory system 200.

Figure 5D:
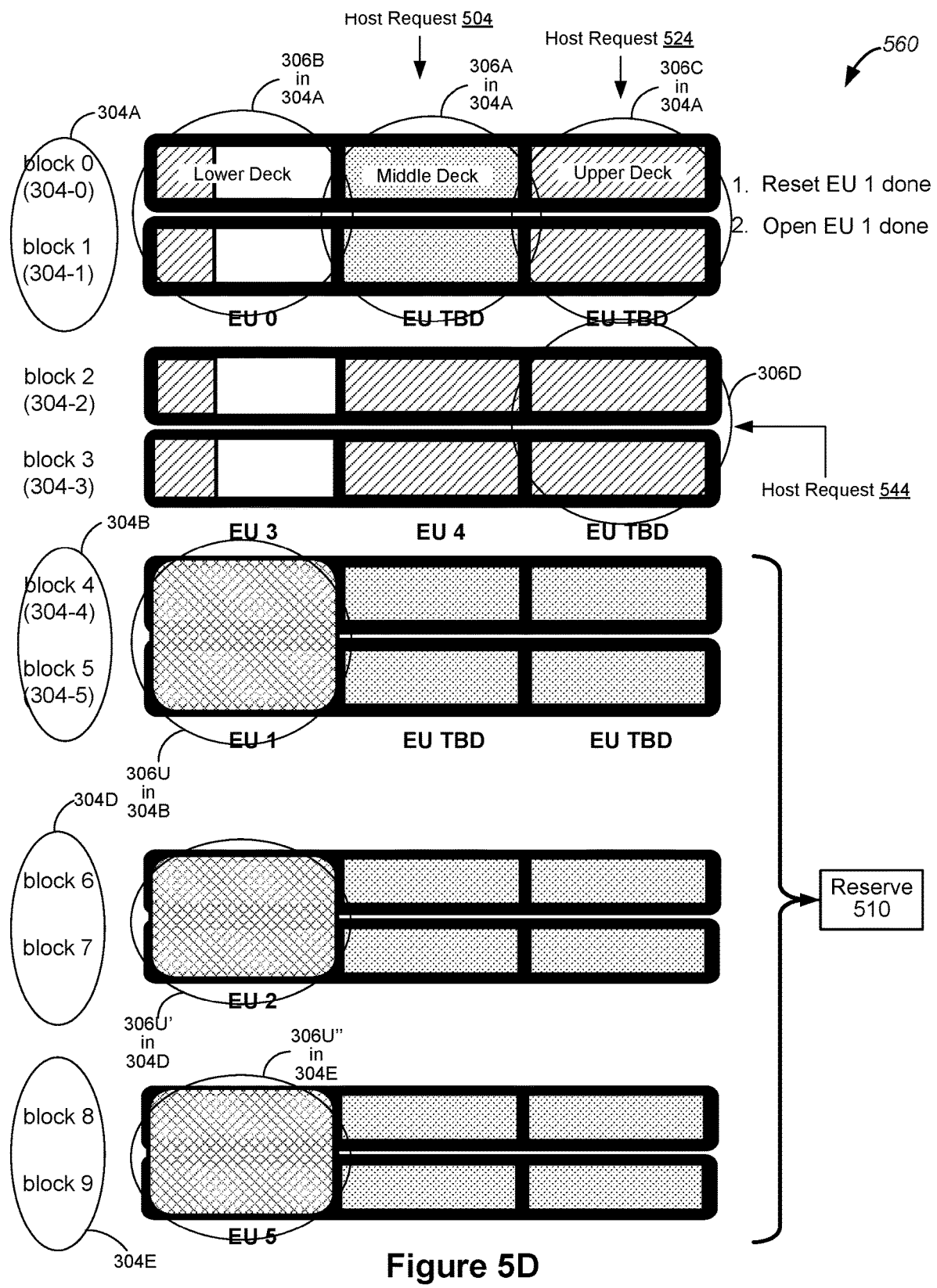
FIG. 5D is another structural diagram of an example memory system that processes two or more host requests concurrently, in accordance with some embodiments.
Figure 5E:
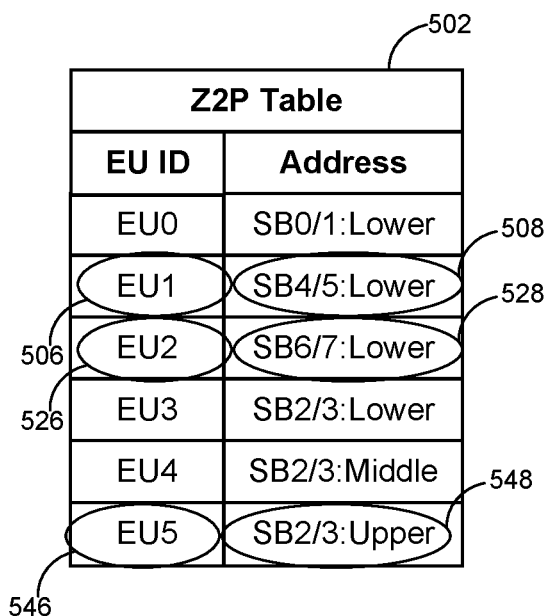
FIG. 5E is an associated zone map, in accordance with some embodiments.

FIG. 5D is another structural diagram 560 of a memory system 200 that processes two or more host requests concurrently, in accordance with some embodiments, and FIG. 5E is an associated zone map 502, in accordance with some embodiments. In some embodiments, the host request 504 including a first host request. The memory system 200 receives a second host request 524 including a zone identifier of "EU2" (526) for an erase operation on an additional erasable unit 306C of the first memory block 304A. In response to the second host request 524, concurrently with responding to the first host request 504, the memory device 200 identifies an unused erasable unit 306U' of a fourth memory block 304D (which optionally includes two decks on two memory blocks). The additional erasable unit 306C of the first memory block 304A is mapped to the unused erasable unit 306U' of the fourth memory block 304D. In the zone map table 502, the zone identifier of "EU2" is associated with a physical address 528 of the unused erasable unit 306U' of the fourth memory block 304D. The erase operation of the second host request 524 is applied on the unused erasable unit 306U' of the fourth memory block 304D in place of the additional erasable unit 306C of the first memory block 304A.

Alternatively, in some embodiments, the host request 504 includes a first host request. The memory system 200 receives a second host request 544 for a plurality of erase operations on a plurality of erasable units (e.g., 306D in FIG. 5D) of a plurality of additional memory block distinct from the first memory block 304A. In response to the second host request 544, concurrently with responding to the first host request 504, for each erase operation on a respective erasable unit of a respective additional memory block, the memory system 200 identifies an unused erasable unit 306U" of a respective fifth memory block 304E, maps the respective erasable unit of the respective additional memory block to the unused erasable unit 306U" of the respective fifth memory block 304E, and applies the respective erase operation of the second host request 544 on the unused erasable unit 306U" of the respective fifth memory block 304E in place of the respective erasable unit 306D of the respective additional memory block. For example, the second host request 544 includes a zone identifier of "EU5" (546). For remapping, the zone identifier of "EU5" is associated with a physical address 548 of the unused erasable unit 306U" of the fifth memory block 304E in the zone map table 502.

Figure 6:
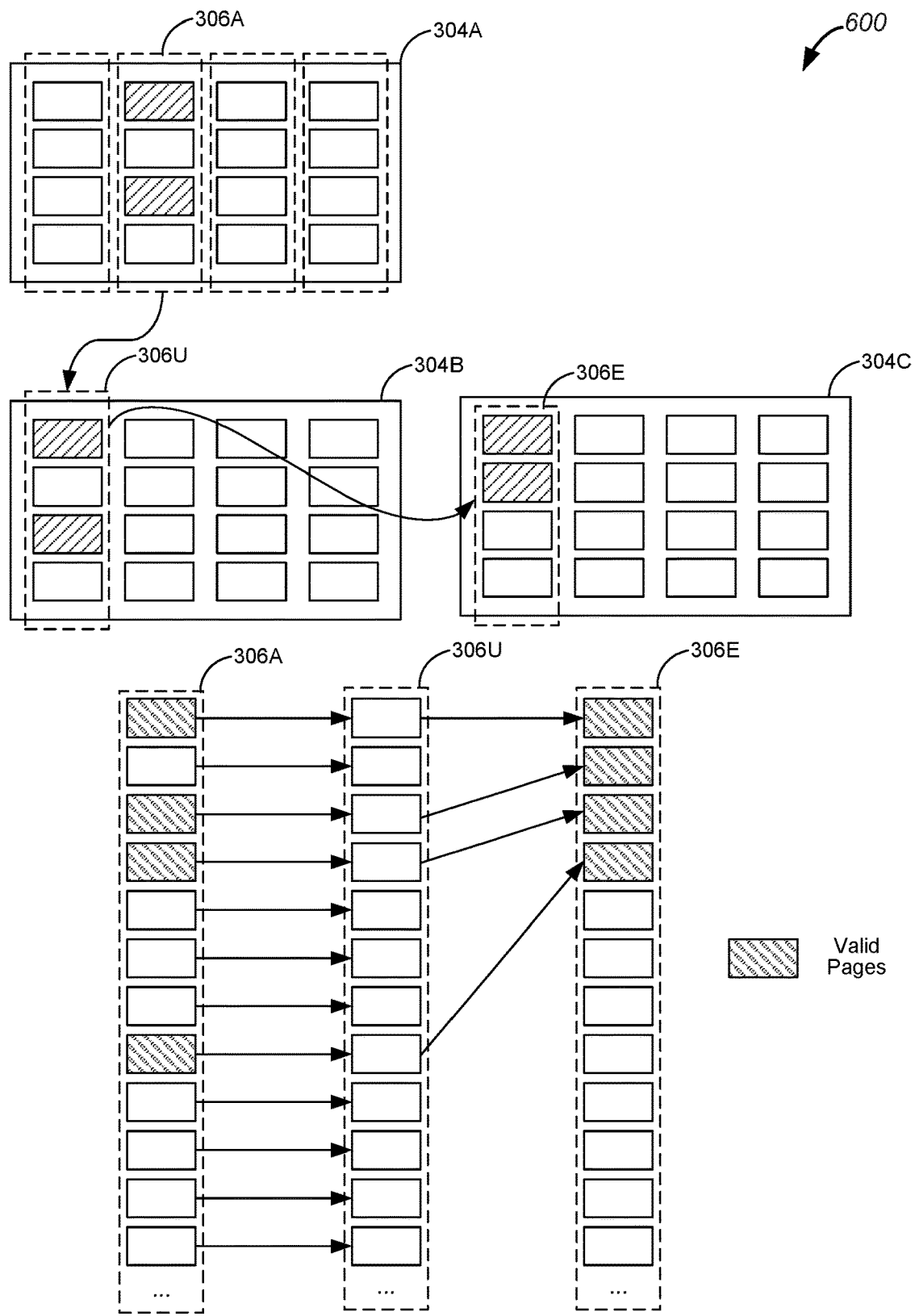
FIG. 6 illustrates an example process of implementing an erase operation on a first erasable unit, in accordance with some embodiments.

FIG. 6 illustrates a process 600 of implementing an erase operation on a first erasable unit 306A, in accordance with some embodiments. The memory system 200 is coupled to a host device 220 (FIG. 2), and a host request 504 is received from the host device 220. In response to the host request 504, the memory system 200 identifies an unused erasable unit 306U of a second memory block 304B, remaps the first erasable unit 306A of the first memory block 304A to the unused erasable unit 306U of the second memory block 304B, and applies the erase operation on the unused erasable unit 306U of the second memory block 304B in place of the first erasable unit 306A of the first memory block 304A. The erase operation is applied on the unused erasable unit 306U of the second memory block 304B offline without communicating with the host device 220.

For example, in some situations, the memory system 200 determines that a set of valid memory pages of the first erasable unit 306A is mapped to a set of first memory pages in the unused erasable unit 306U of the second memory block 304B. The set of first memory pages in the unused erasable unit 306U of the second memory block 304B is mapped to a set of valid memory pages of a third erasable unit 306E of a third memory block 304C. During a subsequent garbage collection cycle, the set of valid memory pages of the first erasable unit 306A of the first memory block 304A is copied to the set of valid memory pages of the third erasable unit 306E of the third memory block 304C.

In some embodiments, each empty erasable unit 306 is opened before data is written into the erasable unit 306, and closed after the data is written into the erasable unit 306. In some embodiments, an erasable unit 306 storing the data is read only, and cannot be erased. In some embodiments, an erasable unit 306 is pulled offline and cannot be accessed for read or write. In some embodiments, a subset of the memory system 200 is full and erased jointly. In some embodiments, the memory system 200 has one or more upper limits on a number of erasable units 306 that can be active or open concurrently. The one or more upper limits include a maximum active resource (MAR) level, a maximum open resource (MOR) level, or both. In some embodiments, the MAR level is 128 zones per terabyte (TB), and the MOR level is equal to or lower than the MAR level. The memory system 200 sets a predefined size limit on a total size of erasable units that are be remapped and opened to avoid the memory policy. For example, the predefined size limit is one sixty-fourth of a total number of erasable units in the memory system 200 during any duration of 140 seconds. The predefined size limit is less than the MOR level.

The MOR level limits the total size of erasable units that are be remapped and the size of the space reserve 510. Under most circumstances, the memory system 200 can easily provide the space reserve 510 without compromising its storage capability.

In some embodiments, the size of the space reserve 510 is preferred to be minimized. In some situations, the space reserve 510 accounts for the worst-case lockouts of erasable units 306, and has a size of $\frac{2}{3} \times MAR \times 2$ memory blocks, where MAR is the MAR level. When a random erasable unit 306 is opened, a probability of deck collision PDC is estimated as follows:

$$PDC=(MAR-1)*(DecksPerBlock-1)/(NumZones-(MAR-1))$$

where DecksPerBlock is a number of erasable units 306 associated with each memory block 304 (e.g., in a corresponding memory block set including the memory block 304), and NumZones is a total number of erasable units 306 in the memory system 200. In an example, the probability of deck collision PDC is approximately 2.93%. Additionally, odds of requiring worst-case space reserve usage is very low in random workloads. In some embodiments, a size of the space reserve 510 is initially set to be 0% of the memory system 200, and increases on demand to enable an optimal reserve usage. In some embodiments, the memory system 200 applies a mechanism to dynamically move erasable units 306 offline and increase the size of the space reserve 510.

Over-provisioning space does not need to be reserved in advance and can be created on demand to enable concurrent memory operations in compliance with the memory policy, thereby reducing a size of the space reserve 510 of over-provisioning pre-defined and waiting in the memory system 200. In some embodiments, the space reserve 510 is allocated on demand to enable an optimal reserve usage. When the host device 220 attempts to open a first erasable unit 306A (FIGS. 5A-5C) that is locked out and there is no space reserve 510 available, the controller 202 pulls an unused erasable unit 306U offline and dynamically allocates the unused erasable unit 306U to the space reserve 510.

Figure 7:
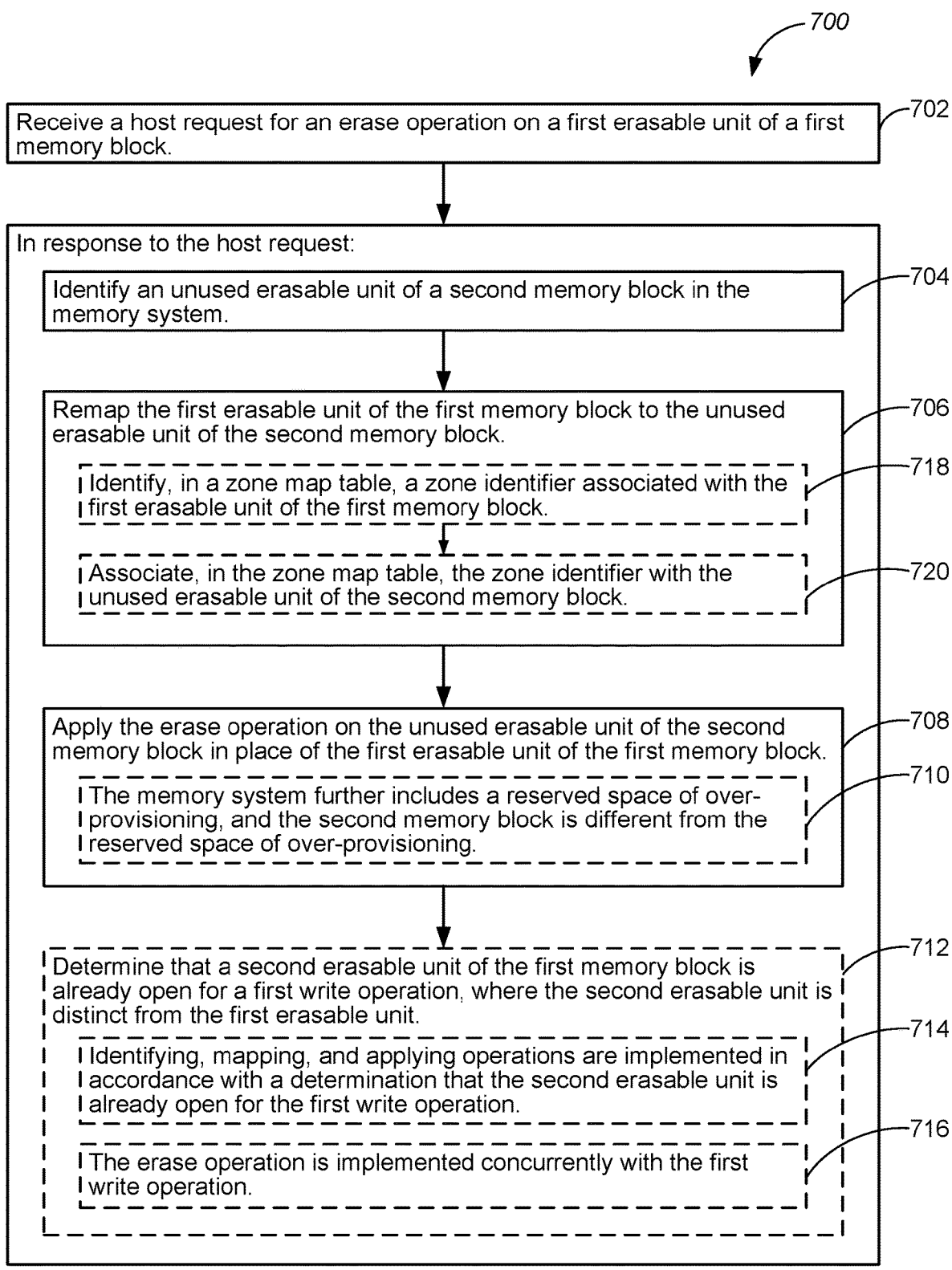
FIG. 7 is a flow diagram of an example method for managing data storage in a memory system (e.g., an SSD) of an electronic device, in accordance with some embodiments.

FIG. 7 is a flow diagram of a method 700 for managing data storage in an electronic device, in accordance with some embodiments. The method 700 is implemented at an electronic device including a memory system 200 (FIG. 2). The memory system 200 receives (operation 702) a host request 504 for an erase operation on a first erasable unit 306A of a first memory block 304A. In response to the host request 504, the memory system 200 identifies (operation 704) an unused erasable unit 306U of a second memory block 304B in the memory system 200, remaps (operation 706) the first erasable unit 306A of the first memory block 304A to the unused erasable unit 306U of the second memory block 304B, and applies (operation 708) the erase operation on the unused erasable unit 306U of the second memory block 304B in place of the first erasable unit 306A of the first memory block 304A. More details on data storage management are explained above with reference to at least FIGS. 5A-5C.

In some embodiments, the memory system 200 further includes (operation 710) a space reserve (e.g., a reserve 510 in FIG. 5A) of over-provisioning, and at a time of receiving the host request, the second memory block 304B is different from (i.e., not included in) the space reserve of over-provisioning. In some embodiments, after the unused erasable unit 306U of the second memory block is identified, the unused erasable unit 306U is moved to an offline state to become part of the space reserve 510 (FIG. 5A) of over-provisioning. The memory system 200 sends a message to a host device 220, indicating that the unused erasable unit 306U of the second memory block 304B is moved offline to the space reserve 510. Further, in some embodiments, the second memory block includes one or more remaining erasable units distinct from the unused erasable unit 306U. The one or more remaining erasable units of the second memory block 304B are moved to the offline state jointly with the unused erasable unit 306U, and become part of the space reserve 510.

Further, in some embodiments, the memory device 200 determines (operation 712) that a second erasable unit of the first memory block 304A is already open for a first write operation. The second erasable unit is distinct from the first erasable unit 306A. Identifying, mapping, and applying operations are implemented (operation 714) in accordance with a determination that the second erasable unit is already open for the first write operation. Further, in some situations, the erase operation is implemented (operation 716) concurrently with the first write operation.

In some embodiments, the memory system 200 remaps the first erasable unit 306A of the first memory block 304A to the unused erasable unit 306U of the second memory block 304B by identifying (operation 718), in a zone map table, a zone identifier associated with the first erasable unit 306A of the first memory block 304A and associating (operation 720), in the zone map table, the zone identifier with the unused erasable unit 306U of the second memory block 304B.

In some embodiments, the memory system 200 applies the erase operation by determining that a set of valid memory pages of the first erasable unit 306A is mapped to a set of first memory pages in the unused erasable unit 306U of the second memory block 304B and mapping the set of first memory pages in the unused erasable unit 306U of the second memory block 304B to a set of valid memory pages of a third erasable unit of a third memory block. Further, in some embodiments, during a subsequent garbage collection cycle, the memory system 200 copies the set of valid memory pages of the first erasable unit 306A of the first memory block 304A to the set of valid memory pages of the third erasable unit of the third memory block.

In some embodiments, after remapping the first erasable unit 306A of the first memory block 304A to the unused erasable unit 306U of the second memory block 304B, the memory system 200 opens the unused erasable unit 306U of the second memory block 304B for one or more second write operations. Further, in some embodiments, the unused erasable unit 306U of the second memory block 304B is opened concurrently with a second erasable unit of the first memory block 304A.

In some embodiments, the memory system 200 identifies a plurality of erasable units in the first memory block 304A. The first memory block 304A includes a plurality of memory pages that are grouped into the plurality of erasable units, and each erasable unit is a respective smallest unit of access for an erase operation on the memory system 200. Further, in some embodiments, prior to receiving the host request 504, the memory system 200 opens a second erasable unit of the plurality of erasable units of the first memory block 304A for the write operation, in accordance with a determination that one or more remaining erasable units of the first memory block 304A, including the first erasable unit 306A, are filled and closed for any write or erase operation. Stated another way, the memory system 200 is configured to comply with a predefined rule requiring that each of the plurality of erasable units of the first memory block 304A be opened for the write operation or an erase operation in accordance with a determination that remaining erasable units of the first memory block 304A are filled and closed for any write or erase operation.

In some embodiments, the memory system 200 is coupled to a host device, and the host request 504 is received from the host device, and the erase operation is applied on the unused erasable unit 306U of the second memory block 304B offline without communicating with the host device.

In some embodiments, the host request 504 includes a first host device. The memory system 200 receives a second host request 524 (FIG. 5D) for an erase operation on an additional erasable unit of the first memory block 304A. In response to the second host request 524, concurrently with responding to the first host request 504, the memory system 200 identifies an unused erasable unit 306U of a fourth memory block, maps the additional erasable unit of the first memory block 304A to the unused erasable unit 306U of the fourth memory block, and applies the erase operation of the second host request 524 on the unused erasable unit 306U of the fourth memory block in place of the additional erasable unit of the first memory block 304A.

In some embodiments, the host request 504 includes a first host request. The memory device 200 receives a second host request 544 (FIG. 5D) for a plurality of erase operations on a plurality of erasable units of a plurality of additional memory block distinct from the first memory block 304A. In response to the second host request 544, concurrently with responding to the first host request 504, for each erase operation on a respective erasable unit of a respective additional memory block, the memory device 200 identifies an unused erasable unit 306U of a respective fifth memory block, maps the respective erasable unit of the respective additional memory block to the unused erasable unit 306U of the respective fifth memory block, and applies the respective erase operation of the second host request 544 on the unused erasable unit 306U of the respective fifth memory block in place of the respective erasable unit of the respective additional memory block.

In some embodiments, the second memory block 304B and the first memory block 304A are located on the same memory plane of the memory system 200.

In some embodiments, the second memory block 304B and the first memory block 304A are located on two distinct memory planes of the same memory die of the memory system 200.

In some embodiments, the second memory block 304B and the first memory block 304A are located on two distinct memory dies of the same memory chip of the memory system 200.

In some embodiments, each of the second memory block 304B and the first memory block 304A is configured to provide a respective one of the first erasable unit 306A and the unused erasable unit 306U with a corresponding alternative memory block. Each of the second memory block 304B and the first memory block 304A and the corresponding alternative memory block are located on two distinct memory planes.

Memory is also used to store instructions and data associated with the method 700, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 700.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for managing data storage in a memory system, comprising:
   receiving a host request for an erase operation on a first erasable unit of a first memory block, wherein the first memory block includes a plurality of erasable units that comply with a memory policy in which at most one erasable unit of the first memory block is erased or partially programmed at a time;
   determining that a second erasable unit of the first memory block is already open for an alternative operation distinct from the erase operation; and
   in response to the host request and in accordance with a determination that the second erasable unit is already open:
      identifying an unused erasable unit of a second memory block in the memory system;
      remapping the first erasable unit of the first memory block to the unused erasable unit of the second memory block; and
      applying the erase operation on the unused erasable unit of the second memory block in place of the first erasable unit of the first memory block, concurrently with implementing the alternative operation on the second erasable unit.

2. The method of claim 1, wherein the memory system further includes a space reserve of over-provisioning, and at a time of receiving the host request, the second memory block is different from the space reserve of over-provisioning.

3. The method of claim 1, further comprising after identifying the unused erasable unit:
   moving the unused erasable unit of the second memory block to an offline state; and
   sending a message to a host device indicating that the unused erasable unit of the second memory block is moved offline.

4. The method of claim 3, wherein the second memory block includes one or more remaining erasable units distinct from the unused erasable unit, the method further comprising:
   moving the one or more remaining erasable units of the second memory block to the offline state jointly with the unused erasable unit.

5. The method of claim 1, further comprising:
   determining that the second erasable unit of the first memory block is already open for a first write operation, independently of the erase operation, wherein the second erasable unit is distinct from the first erasable unit;
   wherein identifying, mapping, and applying operations are implemented in accordance with a determination that the second erasable unit is already open for the first write operation.

6. The method of claim 1, wherein remapping the first erasable unit of the first memory block to the unused erasable unit of the second memory block further comprises:
   identifying, in a zone map table, a zone identifier associated with the first erasable unit of the first memory block; and
   associating, in the zone map table, the zone identifier with the unused erasable unit of the second memory block.

7. The method of claim 1, wherein applying the erase operation further comprises:
   determining that a set of valid memory pages of the first erasable unit is mapped to a set of first memory pages in the unused erasable unit of the second memory block; and
   mapping the set of first memory pages in the unused erasable unit of the second memory block to a set of valid memory pages of a third erasable unit of a third memory block.

8. The method of claim 7, further comprising, during a subsequent garbage collection cycle:
   copying the set of valid memory pages of the first erasable unit of the first memory block to the set of valid memory pages of the third erasable unit of the third memory block.

9. The method of claim 1, further comprising, after remapping the first erasable unit of the first memory block to the unused erasable unit of the second memory block:
   opening the unused erasable unit of the second memory block for one or more second write operations.

10. The method of claim 9, wherein the unused erasable unit of the second memory block is opened concurrently with a second erasable unit of the first memory block.

11. The method of claim 1, further comprising:
    identifying a plurality of erasable units in the first memory block, wherein the first memory block includes a plurality of memory pages that are grouped into the plurality of erasable units, and each erasable unit is a respective smallest unit of access for an erase operation on the memory system.

12. The method of claim 11, further comprising:
    prior to receiving the host request, opening a second erasable unit of the plurality of erasable units of the first memory block for a first write operation, in accordance with a determination that one or more remaining erasable units of the first memory block, including the first erasable unit, are filled and closed for any write or erase operation.

13. The method of claim 1, wherein each of the first erasable unit, the second erasable unit, and the unused erasable unit includes two or more pages that are configured to be erased jointly in a respective erase operation.

14. An electronic device, comprising:
one or more processors;
a memory system; and
memory storing one or more programs, the one or more programs having instructions to be executed by the one or more processors for:
receiving a host request for an erase operation on a first erasable unit of a first memory block, wherein the first memory block includes a plurality of erasable units that comply with a memory policy in which at most one erasable unit of the first memory block is erased or partially programmed at a time;
determining that a second erasable unit of the first memory block is already open for an alternative operation distinct from the erase operation; and
in response to the host request and in accordance with a determination that the second erasable unit is already open:
identifying an unused erasable unit of a second memory block in the memory system;
remapping the first erasable unit of the first memory block to the unused erasable unit of the second memory block; and
applying the erase operation on the unused erasable unit of the second memory block in place of the first erasable unit of the first memory block, concurrently with implementing the alternative operation on the second erasable unit.

15. The electronic device of claim 14, wherein the memory system is coupled to a host device of the electronic device, and the host request is received from the host device, and the erase operation is applied on the unused erasable unit of the second memory block offline without communicating with the host device.

16. The electronic device of claim 14, wherein the second memory block and the first memory block are located on the same memory plane, two distinct memory planes of the same memory die, or two distinct memory dies of the same memory channel of the memory system.

17. The electronic device of claim 14, the host request including a first host device request, the one or more programs further comprising instructions for:
receiving a second host request for an erase operation on an additional erasable unit of the first memory block;
in response to the second host request, concurrently with responding to the first host request:
identifying an unused erasable unit of a fourth memory block;
mapping the additional erasable unit of the first memory block to the unused erasable unit of the fourth memory block; and
applying the erase operation of the second host request on the unused erasable unit of the fourth memory block in place of the additional erasable unit of the first memory block.

18. A non-transitory computer-readable storage medium storing one or more programs, the one or more programs having instructions to be executed by one or more processors for:
receiving a host request for an erase operation on a first erasable unit of a first memory block, wherein the first memory block includes a plurality of erasable units that comply with a memory policy in which at most one erasable unit of the first memory block is erased or partially programmed at a time;
determining that a second erasable unit of the first memory block is already open for an alternative operation distinct from the erase operation; and
in response to the host request and in accordance with a determination that the second erasable unit is already open:
identifying an unused erasable unit of a second memory block in the memory system;
remapping the first erasable unit of the first memory block to the unused erasable unit of the second memory block; and
applying the erase operation on the unused erasable unit of the second memory block in place of the first erasable unit of the first memory block, concurrently with implementing the alternative operation on the second erasable unit.

19. The non-transitory computer-readable storage medium of claim 18, wherein:
each of the second memory block and the first memory block is configured to provide a respective one of the first erasable unit and the unused erasable unit with a corresponding alternative memory block; and
each of the second memory block and the first memory block and the corresponding alternative memory block are located on two distinct memory planes.

20. The non-transitory computer-readable storage medium of claim 18, the host request including a first host request, the one or more programs further comprising instructions for:
receiving a second host request for a plurality of erase operations on a plurality of erasable units of a plurality of additional memory block distinct from the first memory block;
in response to the second host request, concurrently with responding to the first host request, for each erase operation on a respective erasable unit of a respective additional memory block:
identifying an unused erasable unit of a respective fifth memory block;
mapping the respective erasable unit of the respective additional memory block to the unused erasable unit of the respective fifth memory block; and
applying the respective erase operation of the second host request on the unused erasable unit of the respective fifth memory block in place of the respective erasable unit of the respective additional memory block.

* * * * *